United States Patent
Boulet et al.

(10) Patent No.: US 10,618,659 B2
(45) Date of Patent: Apr. 14, 2020

(54) VENTILATION APPARATUS, AIRCRAFT COMPRISING A SUCH VENTILATION APPARATUS AND ASSOCIATED MONITORING METHOD

(71) Applicant: TECHNOFAN, Blagnac (FR)

(72) Inventors: Guillaume Boulet, L'Isle Jourdain (FR); Jean-Christophe Lombard, Saint Alban (FR); Pascal Toutain, Blagnac (FR)

(73) Assignee: TECHNOFAN, Blagnac (FR)

( * ) Notice: Subject to any disclaimer, the term of this patent is extended or adjusted under 35 U.S.C. 154(b) by 704 days.

(21) Appl. No.: 14/844,060

(22) Filed: Sep. 3, 2015

(65) Prior Publication Data

US 2016/0068269 A1    Mar. 10, 2016

(30) Foreign Application Priority Data

Sep. 5, 2014  (FR) ...................... 14 58365

(51) Int. Cl.
*B64D 13/02* (2006.01)
*H02P 3/18* (2006.01)
(Continued)

(52) U.S. Cl.
CPC ............. *B64D 13/02* (2013.01); *B64D 13/08* (2013.01); *F04D 15/0094* (2013.01);
(Continued)

(58) Field of Classification Search
CPC .................... B64D 13/02; B64D 13/08; B64D 2013/0644; F04D 15/0094
(Continued)

(56) References Cited

U.S. PATENT DOCUMENTS 6,058,715 A     5/2000  Strang et al.
2008/0226442 A1* 9/2008  Darnis .................. F04D 27/001
                                                    415/118
(Continued)

FOREIGN PATENT DOCUMENTS

FR          2 872 573         1/2006

OTHER PUBLICATIONS

French Search Report for FR 1458365 dated May 5, 2015.

*Primary Examiner* — Gregory L Huson
*Assistant Examiner* — Dana K Tighe
(74) *Attorney, Agent, or Firm* — B. Aaron Schulman, Esq.; Stites & Harbison, PLLC

(57) ABSTRACT

The ventilation apparatus (20) according to the invention comprises a fan (30) including a rotary machine (32) and a fan wheel (34), an observation module, a module for connecting the device (20) to a power source (12), the fan wheel (34) being set in rotation by the rotary machine (32) when the apparatus (20) is connected to the power source (12), and rotating freely when the apparatus (20) is disconnected from the power source (12).

The device (20) further includes an internal power module electrically connected between the rotary machine (32) and the observation module, the internal power module being able to recover an electric current generated by the rotary machine (32) driven by the fan wheel (34), to power the observation module (62), when the apparatus (20) is disconnected from the power source (12).

13 Claims, 2 Drawing Sheets

(51) Int. Cl.
  *B64D 13/08* (2006.01)
  *H02P 3/14* (2006.01)
  *F04D 15/00* (2006.01)
  *F04D 25/06* (2006.01)
  *F04D 27/00* (2006.01)
  *B64D 13/06* (2006.01)

(52) U.S. Cl.
  CPC ............ *F04D 25/06* (2013.01); *F04D 25/068* (2013.01); *F04D 27/001* (2013.01); *H02P 3/14* (2013.01); *H02P 3/18* (2013.01); *B64D 2013/0644* (2013.01); *Y02T 50/56* (2013.01)

(58) Field of Classification Search
  USPC .......................................................... 454/76
  See application file for complete search history.

(56) References Cited

U.S. PATENT DOCUMENTS

| | | |
|---|---|---|
| 2011/0204628 A1 | 8/2011 | Darnis |
| 2013/0154357 A1* | 6/2013 | Schult .................... B60R 16/03 307/9.1 |
| 2015/0183387 A1 | 7/2015 | Lepage et al. |

\* cited by examiner

VENTILATION APPARATUS, AIRCRAFT COMPRISING A SUCH VENTILATION APPARATUS AND ASSOCIATED MONITORING METHOD

FIELD OF THE INVENTION

The present invention relates to a ventilation apparatus comprising:
- a fan including a rotary electric machine having a rotary shaft, and a fan wheel secured to the rotary shaft;
- an observation module able to generate at least one observation datum relative to the operation of the fan;
- a module for connecting the ventilation apparatus to an external power source, the connecting module including a switch making it possible to connect the ventilation apparatus to the external power source in order to power the rotary electric machine and the observation module, and to disconnect the ventilation apparatus from the external power source;
- the fan wheel being set in rotation by the rotary electric machine when the ventilation apparatus is connected to the external power source, and rotating freely when the ventilation apparatus is disconnected from the external power source.

BACKGROUND OF THE INVENTION

It is known in the state of the art to use ventilation apparatuses on board various types of aircraft, in particular on board airplanes.

In general, these ventilation apparatuses are used to cool different pieces of onboard equipment, for example onboard computers, or other types of devices equipping those aircraft.

To that end, such a ventilation apparatus includes a rotary machine powered by an electric power grid of the aircraft and a fan wheel secured to the rotor of the rotary machine. The fan wheel is for example formed by a propeller and is positioned in an air duct emerging outside the aircraft.

Thus, when the ventilation apparatus is turned on, i.e., when the rotary machine is connected to the electric grid, the fan wheel suctions cool air from outside the aircraft toward a heat exchanger to cool the corresponding onboard equipment.

This type of cooling, also called forced ventilation, is more particularly used when the aircraft is on the ground. In that case, various monitoring means may be used to monitor the operation of the ventilation apparatus, and if an anomaly is detected, to generate a corresponding alarm. These monitoring means are generally powered by an electric current from the electric grid of the aircraft.

When the aircraft is in flight, its movement speed is generally sufficient to create a natural air flow in the duct due to the movement of the aircraft in the mass of air, and the operation of the ventilation apparatus is no longer necessary. In those cases, the ventilation apparatus is disconnected from the power grid and the monitoring means are inactive.

However, it is often necessary to monitor the ventilation apparatus in order to detect and/or avoid damage thereto when it is not powered.

SUMMARY OF THE INVENTION

The present invention aims to propose a ventilation apparatus including monitoring means making it possible to resolve this problem.

To that end, the invention relates to a ventilation apparatus of the aforementioned type further including an internal power module electrically connected between the rotary electric machine and the observation module, the internal power module being able to recover an electric current generated by the rotary electric machine driven by the freely rotating fan wheel, to power the observation module, when the ventilation apparatus is disconnected from the external power source.

The ventilation apparatus according to the invention may comprise one or more of the following features, considered alone or according to any technically possible combination:
- the rotary electric machine is a synchronous machine;
- the rotary electric machine includes a stator and a rotor, the rotor being secured to the rotary shaft and including permanent magnets;
- the rotary electric machine is a three-phase machine;
- the apparatus further includes a reversible inverter connected to the connecting module and the internal power module on the one hand, and to the rotary electric machine on the other hand, the inverter being able to adapt the electric current provided by the external power source to power the rotary electric machine when the ventilation apparatus is connected to the external power source, and to connect the internal power module to the rotary electric machine to provide the current generated by the rotary electric machine to the internal power module when the ventilation apparatus is disconnected from the external power source;
- the or each observation datum generated by the observation module comprises one or more pieces of information chosen from the group comprising:
  - speed of rotation of the fan wheel;
  - direction of rotation of fan wheel;
  - temperature of the ambient air in a predetermined zone adjacent to the fan wheel;
  - temperature of a predetermined zone of the fan wheel;
  - temperature of a predetermined zone of the rotary electric machine; and
  - pressure of the air upstream or downstream from the fan wheel;
- the rotary electric machine includes a stator and a rotor secured to the rotary shaft;
- the or each observation datum generated by the observation module comprises the information on the position of the rotor relative to the stator;
- the device further includes an analysis module able to receive the or each observation datum generated by the observation module, analyze the received observation data and generate an alarm based on the results of that analysis; and
- the analysis module is able to be powered by the external power source when the ventilation apparatus is connected to the external power source, and by the internal power module when the ventilation apparatus is disconnected from the external power source.

The invention also relates to an aircraft including such a ventilation apparatus, the ventilation apparatus being connected to an electric power grid of the aircraft.

The invention also relates to a method for monitoring such a ventilation apparatus including a monitoring phase in motor mode and a monitoring phase in freewheel mode,
- the monitoring phase in motor mode including the following steps:
  - connecting the ventilation apparatus to the external power source via the connecting module;

powering the observation module using the external power source;

the freewheel monitoring mode phase including the following steps:

disconnecting the ventilation apparatus from the external power source; and powering the observation module using an electric current generated by the rotary electric machine driven by the freely rotating fan wheel, via the internal power module.

BRIEF DESCRIPTION OF THE DRAWINGS

The present invention will be better understood upon reading the following description, provided solely as an example and done in reference to the appended drawings, in which.

DETAILED DESCRIPTION OF THE INVENTION

Figure 1:
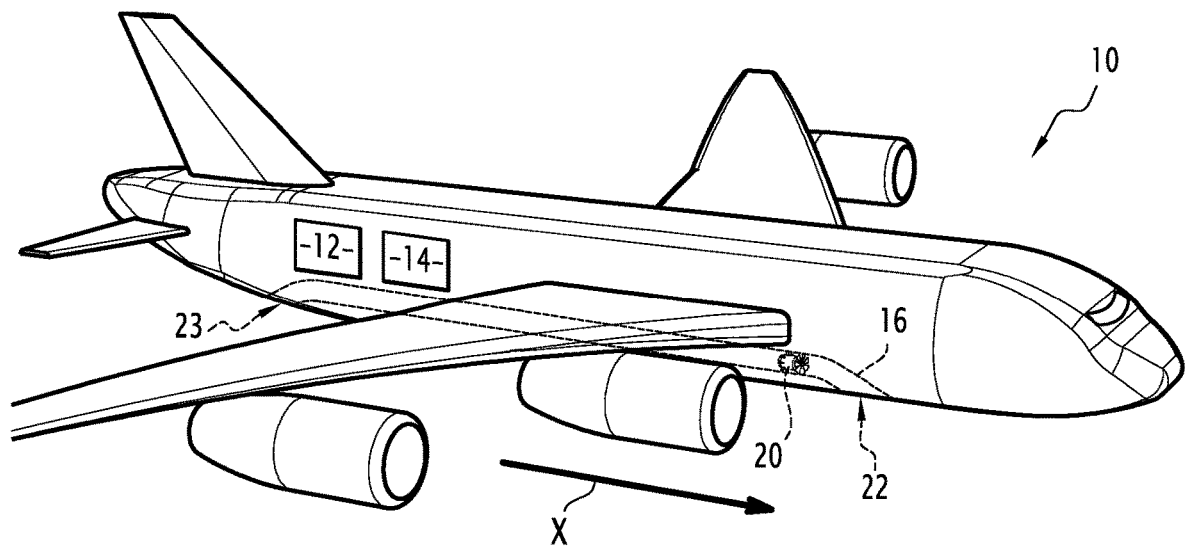
FIG. 1 is a diagrammatic view of an aircraft according to the invention.

The aircraft 10 of FIG. 1 includes an electric power grid 12, a piece of onboard equipment 14, an air duct 16 emerging outside the aircraft 10, and a ventilation apparatus 20 according to the invention positioned at least partially in the air duct 16 and able to create a flow of air from the air duct 16.

The aircraft 10 is for example an airliner.

The electric power grid 12 is an electric grid able to provide a DC current and traditionally usable in airplanes. The voltage of the grid 12 is for example equal to 28 V.

Alternatively, the electric power grid 12 is able to provide an AC current with a voltage of 115 V or 230 V.

The electric power grid 12 comprises at least two connecting terminals making it possible to electrically connect the ventilation apparatus 20.

The onboard equipment 14 comprises all equipment of the aircraft 10 whereof cooling is necessary during at least certain operating phases of the aircraft 10. One example of such a piece of equipment is an onboard computer.

In FIG. 1, the air duct 16 extends substantially along a longitudinal movement axis X of the aircraft 10.

The air duct 16 includes an air inlet 22 positioned in the front part of the aircraft 10, an air outlet 23 positioned in the rear part of the aircraft 10 and a cylindrical segment in which a heat exchanger 24 is transversely positioned.

The air inlet 22 and the air outlet 23 are suitable for allowing a natural flow of air to flow when the aircraft moves on the ground and/or when the aircraft 10 is in flight.

According to one example embodiment, a gate is positioned at the air inlet 22 to optionally prevent the passage of air in the air duct 16.

Furthermore, when the aircraft 10 is immobile or when its speed is insufficient to create a flow of air in the air duct 16 naturally, the ventilation apparatus 20 is able to create a flow of air in the air duct 16 in a forced manner, as will be described below.

Figure 2:
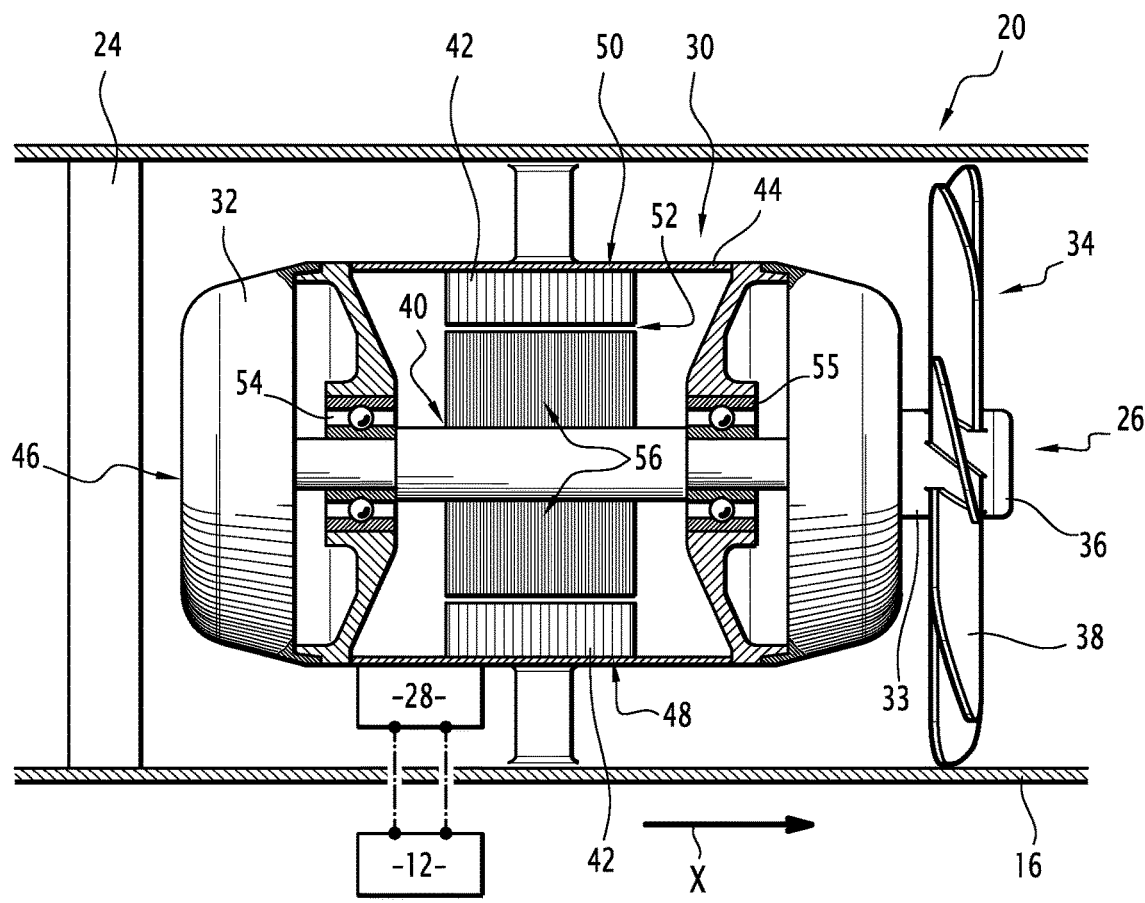
FIG. 2 is a diagrammatic, partially sectional view of a ventilation apparatus according to the invention.

The exchanger 24, shown in FIG. 2, is thermally connected to the onboard equipment 14 and makes it possible to cool that equipment 14 when it is exposed to a flow of air flowing in the air duct 16.

The ventilation apparatus 20 is illustrated in more detail in FIG. 2.

According to this FIG. 2, the ventilation apparatus 20 includes a mechanical part 26 positioned in the cylindrical segment of the air duct 16 and an electronic part 28 connected to the mechanical part and positioned inside and/or outside the air duct 16.

The mechanical part 26 comprises a fan 30 including a rotary electric machine 32 having a rotary shaft 33, and a fan wheel 34 secured to the rotary shaft 33.

The fan wheel 34 includes a hub 36 of revolution. The hub 36 bears a set of blades 38, the free end of which substantially follows the profile of the inner surface of the cylindrical segment of the air duct 16.

The fan wheel 34 is for example a propeller.

The rotary electric machine 32 is a three-phase electric machine including a rotor 40 and a stator 42. The rotor 40 has a generally cylindrical shape. The stator 42 extends around the rotor 40. Preferably, the rotary electric machine 32 is a synchronous machine.

The stator 42 has a casing 44. The casing 44 includes a base 46 and a cylindrical side wall 48. The base 46 is axially extended forward by the cylindrical side wall 48. The cylindrical side wall 48 forms the outer surface of the rotary electric machine 32.

The casing 44 houses an active part 50 of the stator 42. The active part 50 is fastened on the inner side surface of the cylindrical side wall 48. It includes frames formed by ferromagnetic materials and windings wound around those frames. The active part 50 extends around an air gap 52.

The rotor 40 extends longitudinally at the center of the air gap 52. It is mounted rotatably relative to the stator 42 via rotary means 54, 55 fastened to the casing 44. Said rotary means 54, 55 are for example ball bearings.

The rotor 40 bears, on its outer surface, a set of magnetic elements 56, such as bars of a magnetic material.

The rotor 40 is secured to the rotary shaft 33.

The rotary electric machine 32 is able to operate in motor mode, in which the rotor 40 is rotated by the electromagnetic field created by the stator 42 powered by a current source, and in generator mode, in which the rotor rotated by the fan wheel 34 being freely rotated, it cooperates with the stator 42 via the electromagnetic field to generate an electric current.

The fan wheel 34 is freely rotating when it is rotated by a natural flow of air flowing in the air duct 16. This is particularly the case when the aircraft 10 moves at a high speed, for example its flight speed.

The electronic part 28 makes it possible to connect the mechanical part 26, and in particular the rotary electric machine 32, to the electric power grid 12.

Figure 3:
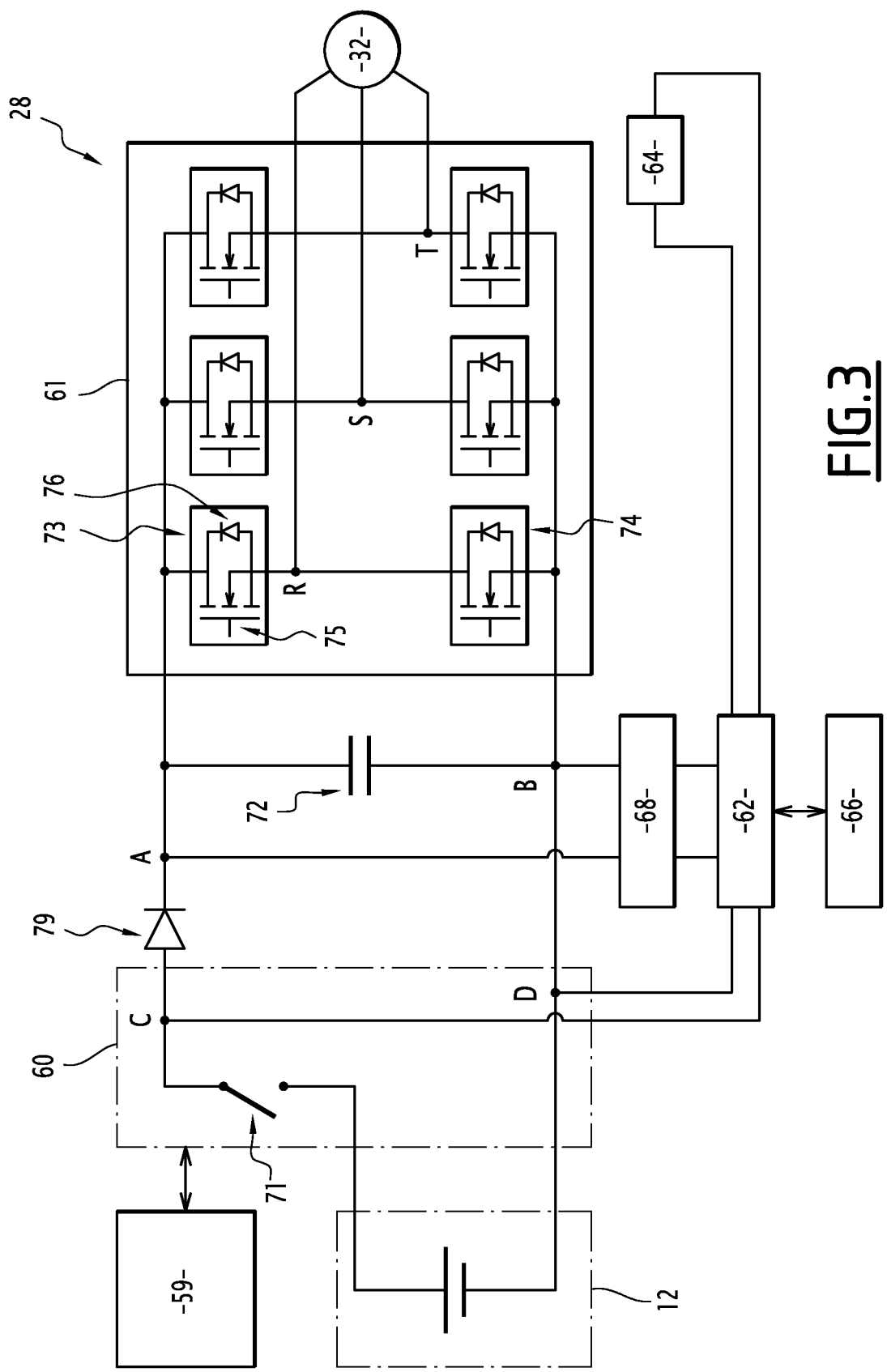
FIG. 3 is a simplified diagram of the electronic structure of the ventilation apparatus of FIG. 2.

The electronic part 28 of the ventilation apparatus 20 is described in more detail in FIG. 3.

Thus, in reference to said FIG. 3, the electronic part 28 of the ventilation apparatus 20 includes a control module 59, a connecting module 60, an inverter 61, an observation modules 62, a set of detectors 64, an analysis module 66 and an internal power module 68.

The control module is for example implemented by software executable by a computer onboard the aircraft 10 to control the operation of all of the modules of the ventilation apparatus 20.

The connecting module 60 makes it possible to electrically connect the ventilation apparatus 20 to the electric power grid 12 of the aircraft 10. More particularly, the connecting module 60 includes a switch 71 controlled by the control module 59, and comprising a closed position and an open position.

When the switch 71 is in the closed position, the ventilation apparatus 20 is connected to the electric supply grid 12, i.e., the electric circuit of the ventilation apparatus 20 is connected to two terminals of the electric power grid 12.

When the switch 71 is in the open position, the ventilation apparatus 20 is disconnected from the electric power grid 12, i.e., the electric circuit of the ventilation apparatus 20 is disconnected from at least one of the two terminals of the electric power grid 12.

The rotary electric machine 32 is connected to the connecting module 60 via a capacitor 72 and via the inverter 61 able to convert the DC electric current provided by the electric power grid 12 into a three-phase current to power the rotary electric machine 32.

To that end, the inverter 61 includes three switching branches corresponding to the three phases of the rotary electric machine 32. These three branches are mounted in parallel between the input terminals A and B corresponding to two output terminals of the connecting module 60.

Each branch includes two switches 73, 74 mounted in series and between which a three-phase supply point R, S, T of the rotary electric machine 32 is formed. Each switch includes a transistor 75 and diode 76 that are mounted in parallel.

The transistor 75 is able to switch between an open position and a closed position. In the closed position, the transistor 75 of each switch 73, 74 is able to allow a current to pass respectively from the terminal A toward one of the terminals R, S, T, or from one of the terminals R, S, T toward the terminal B. In the open position, the transistor 75 does not allow any current to pass.

The transistor 75 is for example an insulated-gate bipolar transistor, for example a transistor of the MOSFET type known in itself.

The diode 76 of each switch 73, 74 is able to allow a current to pass respectively from the terminal B toward one of the terminals R, S, T, or from one of the terminals R, S, T toward the terminal A. When the transistors 75 are all open, the diodes 76 form a rectifier bridge.

The inverter 61 is a reversible inverter, i.e., it makes it possible to convert a three-phase current generated by the rotary electric machine 32 when the latter is in generator mode, into DC current across the terminals A and B.

The observation module 62 is able to monitor the operation of the fan 30.

To that end, the observation module 62 is connected to the set of detectors 64. Each of said detectors is for example positioned near the fan wheel 34 and/or the rotary electric machine 32.

The set of detectors 64 is able to measure and provide measurements relative to the operation of the fan 30. Each physical parameter is chosen from the group comprising:

- speed of rotation of the fan wheel 34;
- direction of rotation of the fan wheel 34;
- temperature of the ambient air in a predetermined zone adjacent to the fan wheel 34;
- temperature of a predetermined zone of the fan wheel 34;
- temperature of a predetermined zone of the rotary electric machine 32;
- position of the rotor 40 relative to the stator 42 of the rotary electric machine 32; and
- pressure of the air upstream or downstream from the fan wheel 34.

The observation module 62 is able to receive these measurements to generate one or more observation data corresponding to those measurements. Said observation data for example assumes the form of numerical data.

Furthermore, the observation module 62 is able to send the generated observation data to the analysis module 66.

The analysis module 66 is able to analyze these received data to detect any operating anomaly of the fan 30. Such an analysis for example comprises comparing values corresponding to the received data with predetermined thresholds. If at least some of these values exceed at least some of these thresholds, the analysis module 66 is able to generate an alarm relative to the detected anomaly and for example send it to the crew of the aircraft 10.

According to one example embodiment, the analysis module includes a storage unit able to store all of the anomalies detected during a predetermined period of the operation of the ventilation apparatus 20.

When the ventilation apparatus 20 is connected to the electric power grid 12, i.e., when the rotary electric machine 32 is in motor mode, the observation module 62 and the analysis module 66 are powered by the electric power grid 12 via connecting terminals C and D of the connecting module 60.

Furthermore, the observation module 62 and the analysis module 66 are connected across the terminals A and B via the internal power module 68.

When the rotary electric machine 32 is in generator mode, the internal power module 68 makes it possible to recover a DC electric current across the terminals A and B generated by the rotary electric machine 32 and converted by the inverter 61.

According to the invention, the internal power module 68 further makes it possible to adapt that electric current to power the observation module 62 and the analysis module 66.

To that end, the internal power module 68 for example includes a low pass filter and a capacitor able to store the electric charges from the terminals A and B.

A diode 79 is also connected between the terminals C and A to prevent the passage of an electric current from terminal A to terminal C.

A monitoring method for the ventilation apparatus 20 according to the invention will now be described.

The monitoring method for the ventilation apparatus 20 is implemented by the control module 59 and includes a monitoring phase in motor mode and a monitoring phase in freewheel mode.

During the monitoring phase in motor mode, the control module 59 commands closing of the switch 71. The ventilation apparatus 20 is thus connected to the electric power grid 12.

The DC electric current from the electric power grid 12 is converted by the inverter 61 into a three-phase current to power the rotary electric machine 32.

The observation module 62 and the analysis module 66 are powered by the electric power grid 12 via the terminals C and D.

During the monitoring phase in freewheel mode, the control module 59 commands the opening of the switch 71. The ventilation apparatus 20 is thus disconnected from the electric power grid 12.

When the fan wheel 34 is rotated by a flow of air flowing in the air duct 16, the rotary electric machine 32 generates a three-phase current that is converted into a DC current by the inverter 61.

This DC current is recovered by the internal power module 68 across the terminals A and B to power the observation module 62 and the analysis module 66.

One can then see that the present invention includes a certain number of advantages.

In fact, the internal power module 62 makes it possible to monitor the ventilation apparatus 20 when the latter is disconnected from the external power source 12 and when the fan wheel 34 is rotating freely.

The monitoring of the non-powered ventilation apparatus 20 is particularly useful when the aircraft 10 is in flight and the flows of air flowing in the air duct 16 at high speeds may damage at least some parts of the ventilation apparatus 20.

In that case, the monitoring makes it possible to warn the crew of any failure and take the necessary measures.

Furthermore, the monitoring of the non-powered ventilation apparatus 20 makes it possible to maintain it in a more targeted and efficient manner. Indeed, when the fan wheel 34 is freely rotating, the observation data stored in a storage unit can next be used for maintenance purposes to better determine all of the loads experienced by the ventilation apparatus 20.

The ventilation apparatus 20 according to the invention makes it possible to detect failures of the air duct 16 causing modifications of the flow of air, for example a failing gate and valve, when the ventilation apparatus 20 is not powered. This is particularly advantageous to detect the direction of the flow of air caused by a breakdown and which may damage other onboard equipment.

Lastly, the analysis of the observation data collected when the ventilation apparatus 20 is not powered makes it possible to anticipate its start-up.

One can then see that these advantages make it possible to increase the reliability of the ventilation apparatus according to the invention and extend its life cycle.

The invention claimed is:

1. A ventilation apparatus comprising:
    a fan including a rotary electric machine having a rotary shaft, and a fan wheel secured to the rotary shaft;
    an observation module able to generate at least one observation datum relative to the operation of the fan;
    a connecting module for connecting the ventilation apparatus to an external power source, the connecting module including a switch making it possible to connect the ventilation apparatus to the external power source in order to power the rotary electric machine and the observation module, and to disconnect the ventilation apparatus from the external power source;
    the fan wheel being set in rotation by the rotary electric machine when the ventilation apparatus is connected to the external power source, and rotating freely when the ventilation apparatus is disconnected from the external power source;
    the ventilation apparatus further comprising an internal power module electrically connected between the rotary electric machine and the observation module, the internal power module being able to recover an electric current generated by the rotary electric machine driven by the freely rotating fan wheel, to power the observation module, when the ventilation apparatus is disconnected from the external power source, the observation module generating said observation datum relative to the operation of the fan when the ventilation apparatus is connected to the external power source and when the ventilation apparatus is disconnected from it,
    wherein the observation module is connected to at least a detector, said detector being able to measure and provide measurements relative to the operation of the fan to the observation module, and
    wherein the ventilation apparatus is configured to cool an onboard piece of equipment different from the observation module.

2. The device according to claim 1, wherein the rotary electric machine is a synchronous machine.

3. The device according to claim 1, wherein the rotary electric machine includes a stator and a rotor, the rotor being secured to the rotary shaft and including permanent magnets.

4. The device according to claim 1, wherein the rotary electric machine is a three-phase machine.

5. The device according to claim 1, further including a reversible inverter connected to the connecting module and the internal power module on the one hand, and the rotary electric machine on the other hand;
    the inverter being able to adapt an electric current provided by the external power source to power the rotary electric machine when the ventilation apparatus is connected to the external power source, and to connect the internal power module to the rotary electric machine to provide the current generated by the rotary electric machine to the internal power module when the ventilation apparatus is disconnected from the external power source.

6. The device according to claim 1, wherein the or each observation datum generated by the observation module comprises one or more pieces of information selected from the group consisting of:
    speed of rotation of the fan wheel;
    direction of rotation of the fan wheel;
    temperature of the ambient air in a predetermined zone adjacent to the fan wheel;
    temperature of a predetermined zone of the fan wheel;
    temperature of a predetermined zone of the rotary electric machine; and
    pressure of the air upstream or downstream from the fan wheel.

7. The device according to claim 1, wherein:
    the rotary electric machine includes a stator and a rotor secured to the rotary shaft; and
    the or each observation datum generated by the observation module comprises the information on the position of the rotor relative to the stator.

8. The device according to claim 1, further including an analysis module able to receive the or each observation datum generated by the observation module, analyze the received observation data and generate an alarm based on the results of that analysis.

9. The device according to claim 8, wherein the analysis module is able to be powered by the external power source when the ventilation apparatus is connected to the external power source, and by the internal power module when the ventilation apparatus is disconnected from the external power source.

10. An aircraft including a ventilation apparatus according to claim 1, the ventilation apparatus being connected to an electric power grid of the aircraft.

11. A method for monitoring a ventilation apparatus according to claim 1, including a monitoring phase in motor mode and a monitoring phase in freewheel mode,
the monitoring phase in motor mode including the following steps:
    connecting the ventilation apparatus to the external power source via the connecting module;

powering the observation module using the external power source;

the monitoring phase in freewheel mode including the following steps:—disconnecting the ventilation apparatus from the external power source;

powering the observation module using the electric current generated by the rotary electric machine driven by the freely rotating fan wheel, via the internal power module.

12. A ventilation apparatus comprising:

a fan including a rotary electric machine having a rotary shaft, and a fan wheel secured to the rotary shaft;

an observation module able exclusively to generate at least one observation datum relative to the operation of the fan;

a connecting module for connecting the ventilation apparatus to an external power source, the connecting module including a switch making it possible to connect the ventilation apparatus to the external power source in order to power the rotary electric machine and the observation module, and to disconnect the ventilation apparatus from the external power source;

the fan wheel being set in rotation by the rotary electric machine when the ventilation apparatus is connected to the external power source, and rotating freely when the ventilation apparatus is disconnected from the external power source;

the ventilation apparatus further including an internal power module electrically connected between the rotary electric machine and the observation module, the internal power module being able to recover an electric current generated by the rotary electric machine driven by the freely rotating fan wheel, to power the observation module, when the ventilation apparatus is disconnected from the external power source, the observation module generating said observation datum relative to the operation of the fan when the ventilation apparatus is connected to the external power source and when the ventilation apparatus is disconnected from it, wherein the or each observation datum generated by the observation module comprises one or more pieces of information selected chosen from the group consisting of:

direction of rotation of the fan wheel;

temperature of the ambient air in a predetermined zone adjacent to the fan wheel;

temperature of a predetermined zone of the fan wheel;

temperature of a predetermined zone of the rotary electric machine; and pressure of the air upstream or downstream from the fan wheel, and wherein the ventilation apparatus is configured to cool an onboard piece of equipment different from the observation module.

13. A ventilation apparatus comprising:

a fan including a rotary electric machine having a rotary shaft, and a fan wheel secured to the rotary shaft;

an observation module able exclusively to generate at least one observation datum relative to the operation of the fan;

a connecting module for connecting the ventilation apparatus to an external power source, the connecting module including a switch making it possible to connect the ventilation apparatus to the external power source in order to power the rotary electric machine and the observation module, and to disconnect the ventilation apparatus from the external power source;

the fan wheel being set in rotation by the rotary electric machine when the ventilation apparatus is connected to the external power source, and rotating freely when the ventilation apparatus is disconnected from the external power source;

the ventilation apparatus further including an internal power module electrically connected between the rotary electric machine and the observation module, the internal power module being able to recover an electric current generated by the rotary electric machine driven by the freely rotating fan wheel, to power the observation module, when the ventilation apparatus is disconnected from the external power source, the observation module generating said observation datum relative to the operation of the fan when the ventilation apparatus is connected to the external power source and when the ventilation apparatus is disconnected from it, wherein the or each observation datum generated by the observation module comprises one or more pieces of information selected chosen from the group consisting of:

direction of rotation of the fan wheel;

temperature of a predetermined zone of the fan wheel;

temperature of a predetermined zone of the rotary electric machine; and pressure of the air upstream or downstream from the fan wheel, and wherein the ventilation apparatus is configured to cool an onboard piece of equipment different from the observation module.

* * * * *